United States Patent
Geng et al.

(10) Patent No.: US 11,778,486 B2
(45) Date of Patent: Oct. 3, 2023

(54) ANTENNA DEVICE AND BASE STATION COMPRISING THE SAME

(71) Applicant: Telefonaktiebolaget LM Ericsson (PUBL), Stockholm (SE)

(72) Inventors: Yi Geng, Nanjing (CN); Cuichun Xia, Nanjing (CN); Jianxiang Zhao, Nanjing (CN); Hao Chen, Nanjing (CN); Ningmin Liu, Beijing (CN)

(73) Assignee: Telefonaktiebolagget LM Ericsson (Publ), Stockholm (SE)

( * ) Notice: Subject to any disclaimer, the term of this patent is extended or adjusted under 35 U.S.C. 154(b) by 162 days.

(21) Appl. No.: 17/434,940

(22) PCT Filed: Mar. 1, 2019

(86) PCT No.: PCT/CN2019/076729
§ 371 (c)(1),
(2) Date: Aug. 30, 2021

(87) PCT Pub. No.: WO2020/177025
PCT Pub. Date: Sep. 10, 2020

(65) Prior Publication Data
US 2022/0150717 A1    May 12, 2022

(51) Int. Cl.
*H01Q 3/01* (2006.01)
*H01Q 15/18* (2006.01)
*H04W 16/28* (2009.01)
*H04W 88/08* (2009.01)

(52) U.S. Cl.
CPC .............. *H04W 16/28* (2013.01); *H01Q 3/01* (2013.01); *H01Q 15/18* (2013.01); *H04W 88/08* (2013.01)

(58) Field of Classification Search
CPC .......... H01Q 3/01; H01Q 3/20; H01Q 15/18; H01Q 15/14; H01Q 19/104; H01Q 19/13; H01Q 19/18; H01Q 21/08; H01Q 21/24; H01Q 1/246
See application file for complete search history.

(56) References Cited

U.S. PATENT DOCUMENTS

| 6,483,480 | B1 | 11/2002 | Sievenpiper et al. |
| 2003/0095076 | A1 | 5/2003 | Lee et al. |

FOREIGN PATENT DOCUMENTS

| CN | 103000989 A | 3/2013 | |
| CN | 103531916 A | 1/2014 | |
| KR | 200371277 Y1 * | 12/2004 | ......... H04B 7/15585 |

OTHER PUBLICATIONS

PCT Notificatoin of Transmittal of the International Search Report and the Written Opinion of the International Searching Authority, or the Declaration issued for International application No. PCT/CN2019/076729—dated Nov. 29, 2019.

* cited by examiner

*Primary Examiner* — Hoang V Nguyen
(74) *Attorney, Agent, or Firm* — Christopher & Weisberg, P.A.

(57) ABSTRACT

Embodiments of the present disclosure provide an antenna device and a base station comprising the same. The antenna device may comprise an antenna array with a radiation pattern including a main lobe and a back lobe; and a first reflector able to be configured to reflect a first part of energy of the back lobe to at least one direction different from a direction of the main lobe.

19 Claims, 12 Drawing Sheets

ANTENNA DEVICE AND BASE STATION COMPRISING THE SAME

PRIORITY

This nonprovisional application is a U.S. National Stage Filing under 35 U.S.C. § 371 of International Patent Application Serial No. PCT/CN2019/076729 filed Mar. 1, 2019 and entitled "Antenna Device and Base Station Comprising the Same" which is hereby incorporated by reference in its entirety.

TECHNICAL FIELD

The non-limiting and exemplary embodiments of the present disclosure generally relate to the technical field of communications, and specifically to antenna device and base station comprising the same.

BACKGROUND

This section introduces aspects that may facilitate a better understanding of the disclosure. Accordingly, the statements of this section are to be read in this light and are not to be understood as admissions about what is in the prior art or what is not in the prior art.

Various wireless devices such as drones and user equipments in planes in the sky are becoming increasingly common. Current regulations limit low-altitude operations (below 400 ft (foot) or 120 m (meter)) to the visual line of sight of a human pilot who is always in control of a drone. Current cellular networks are capable of serving drones in the low-altitude airspace below 120 m. Nonetheless, many enterprises in a wide variety of industries are currently exploring the potential of autonomous drone activity—that is, both beyond visual line of sight (LOS) and without the direct control of a pilot. Examples of such applications include parcel delivery, medical supply delivery, remote and large-scale infrastructure monitoring, and surveillance. In fact, autonomous drone operations are already gaining traction for precision monitoring and mapping applications. Usually these applications request drones fleet with fixed routes and altitude for example more than 300 m. A distinct feature of aerial radio channels is a higher likelihood of LOS propagation due to an absence of obstacles in the sky.

The existing mobile networks such as a cellular network are optimized for terrestrial broadband communication like users on the ground and inside buildings with antennas of base stations being down-tilted to optimize the ground coverage and reduce inter-cell interference. With down-titled base station antenna, drones and planes flying in the sky may be served by side lobes of the base station antenna that have a smaller antenna gain than main lobe's antenna gain. Many challenges may arise for wireless devices such as drones and user equipments in planes at higher altitudes for example more than 300 m.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an antenna device for back lobe radiation.

In a first aspect of the disclosure, there is provided an antenna device. The antenna device comprises an antenna array with a radiation pattern including a main lobe and a back lobe; and a first reflector able to be configured to reflect a first part of energy of the back lobe to at least one direction different from a direction of the main lobe.

In an embodiment, the first part of energy of the back lobe may be from 0% to 100% of the energy of the back lobe.

In an embodiment, at least one of an orientation, a shape and a dimension of the first reflector are able to be adjusted manually or automatically.

In an embodiment, the direction different from the direction of the main lobe may comprise a direction toward sky.

In an embodiment, the first reflector may include one of a metal plate, a wire mesh, parallel wires or metal bars.

In an embodiment, the first reflector may include a plurality of reflector elements each of which comprises one of a metal plate, a wire mesh, parallel wires or metal bars.

In an embodiment, the antenna device may further comprise a second reflector able to be configured to reflect a second part of energy of the back lobe to a direction of the main lobe.

In an embodiment, the energy of the back lobe may consist of the first part of energy of the back lobe and the second part of energy of the back lobe.

In an embodiment, at least one of an orientation, a shape and a dimension of the second reflector is able to be adjusted manually or automatically.

In an embodiment, the second reflector may include one of a metal plate, a wire mesh, parallel wires or metal bars.

In an embodiment, the second reflector may include a plurality of reflector elements each of which comprises one of a metal plate, a wire mesh, parallel wires or metal bars.

In an embodiment, at least a part of the first reflector may be configured to reflect a part of energy of the back lobe to the direction of the main lobe and the at least a part of the first reflector is set in a same plane as the second reflector.

In an embodiment, the antenna device may be used for a base station.

In an embodiment, the antenna device may be used in indoor scenario.

In a second aspect of the disclosure, there is provided a base station. The base station comprises a processor; a memory, the memory containing instructions executable by the processor to implement functions of the base station; the antenna device according to the first aspect of the disclosure. The antenna device is configured to transmit and/or receive a radio frequency (RF) signal.

In a third aspect of the disclosure, there is provided a terminal device. The terminal device comprises a processor; a memory, the memory containing instructions executable by the processor to implement functions of the terminal device; an antenna device configured to transmit and/or receive a radio frequency (RF) signal to and/or from a base station according to the first aspect of the disclosure.

In an embodiment, the terminal device may comprise a drone or a user equipment.

The proposed antenna device can radiate wave such as back lobe to one or more different directions such that the proposed antenna device can be used for at least two coverage areas such as ground coverage and aerial coverage. With the proposed antenna device, the proportion of energy emitted in the forward direction may be decreased and the back lobe is created by emplacing the second reflector with adjustable dimension. The shape and dimension of the second reflector can be adjusted manually or automatically by any suitable device to change the reflection coefficient from 0% to 100%.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1A:
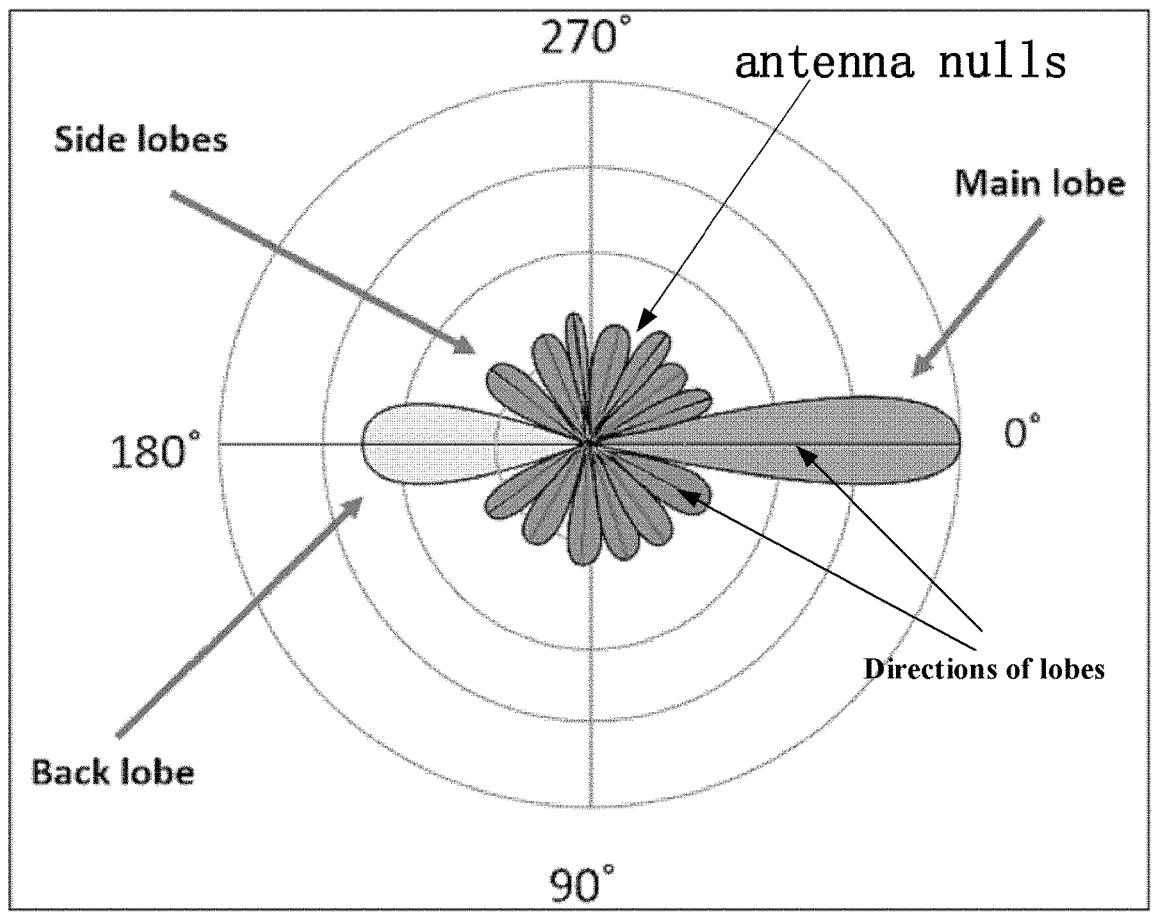
FIG. 1a schematically shows a radiation pattern of an antenna device.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "wireless network" refers to a network following any suitable wireless communication standards such as new radio (NR), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. A CDMA network may implement a radio technology such as Universal Terrestrial Radio Access (UTRA), etc. UTRA includes WCDMA and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, wireless sensor network, etc. In the following description, the terms "network" and "system" can be used interchangeably. Furthermore, the communications between two devices in the network may be performed according to any suitable communication protocols, including, but not limited to, the communication protocols as defined by a standard organization such as 3rd Generation Partnership Project (3GPP). For example, the communication protocols as defined by 3GPP may comprise the second generation (2G), the third generation(3G), the fourth generation (4G), 4.5G, the fourth generation (5G) communication protocols, and/or any other protocols either currently known or to be developed in the future.

The term "network device" refers to a network device in a communication network via which a terminal device accesses to the network and receives services therefrom. For example, in a wireless communication network such as a cellular network, the network device may refer to access network device. The access network device may comprise base station (BS), an Integrated Access and Backhaul (IAB) node, an access point (AP), a multi-cell/multicast coordination entity (MCE), etc. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth. Each access network device is connectable to the core network device over a wired or wireless connection.

The term "terminal device" refers to any end device that can access a communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, a portable computer, an image capture terminal device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable terminal device, a vehicle-mounted wireless terminal device, a wireless endpoint, a mobile station, a laptop-embedded equipment (LEE), a laptop-mounted equipment (LME), a USB dongle, a smart device, a wireless customer-premises equipment (CPE), a drone and the like. In the following description, the terms "terminal device", "terminal", "user equipment" and "UE" may be used interchangeably. As one example, a terminal device may represent a UE configured for communication in accordance with one or more communication standards promulgated by the 3GPP, such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the communication network. Instead, a UE may represent a device that is intended for sale to, or operation by, a human user but that may not initially be associated with a specific human user.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink, DL, transmission refers to a transmission from a network device to a terminal device, and an uplink, UL, transmission refers to a transmission in an opposite direction.

As used herein, a direction of a radiation lobe of the antenna device refers to a direction where the radiated signal strength of the radiation lobe reaches a maximum.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof In the following description and claims, unless defined otherwise, all technical and scientific terms used herein have the same meaning as commonly understood by one of ordinary skills in the art to which this disclosure belongs.

For illustrative purposes, several embodiments of the present disclosure will be described in the context of cellular network. Those skilled in the art will appreciate, however, that the concept and principle of the several embodiments of the present disclosure may be more generally applicable to any other suitable communication networks.

FIG. 1a schematically shows a radiation pattern of an antenna device. The radiation pattern of the antenna device shows a pattern of "lobes" at various angles and directions where the radiated signal strength reaches a maximum. The lobes are separated by "nulls" at angles and directions where the radiated signal strength falls to zero. In a directional antenna in which the objective is to emit the radio waves in one direction, the lobe in that direction may be designed to have a larger field strength than the others. This lobe may be referred to as "main lobe". The other lobes may be referred to as "side lobes", and usually represent unwanted radiation in undesired directions. A side lobe in the opposite direction (180°) from the main lobe is called the back lobe. Different antenna configuration may have different number of side lobes and different angular coverage area (steering range). Traditional directional antenna has a reflector to remove the back lobe and concentrate energy in the direction of main lobe for antenna gain.

Figure 1B:
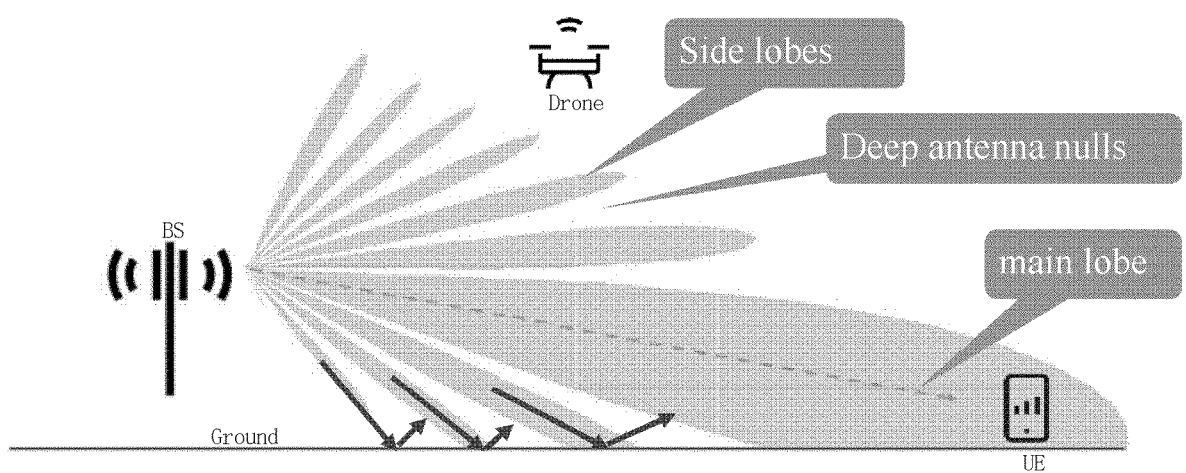
FIG. 1b schematically shows a radiation pattern of an antenna device of a cellular network.

FIG. 1b schematically shows a radiation pattern of an antenna device of a cellular network. The antenna device of FIG. 1b has a reflector configured to reflect the energy of the back lobe to a direction of the main lobe. As shown in FIG. 1b, a terrestrial UE is usually served by the main lobe and side lobes under the main lobe. Since there are ground and many objects (such as buildings) surrounding the terrestrial UE in many directions, even the terrestrial UE locates at a deep antenna null area, the reflections come from the ground and objects serve seamless connectivity for the terrestrial UE. Due to the absence of obstacles in the sky, the wireless devices such as drones flying in the sky may move in the areas where the side lobes are pointing to, and the drones might be served by the side lobes most of the time. The side lobes give rise to the phenomenon of scattered cell associations particularly noticeable in the sky. The UE cell association may be based on the strongest received signal power, i.e., each position is associated with the cell from which the strongest signal is received at that position.

Figure 2:
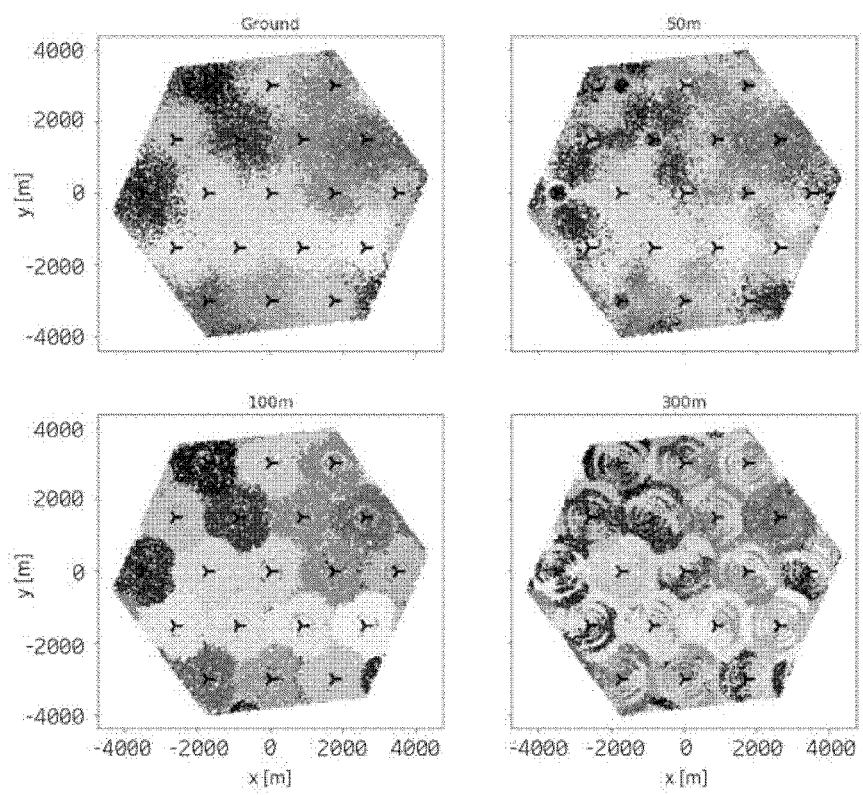
FIG. 2 shows simulated cell association patterns for different altitudes in a cellular network according to an embodiment.

FIG. 2 shows simulated cell association patterns for different altitudes in a cellular network according to an embodiment. As shown in FIG. 2, the cell association pattern on the ground is ideally a nicely defined and contiguous area where the best cell is most often the one closest to the UE. As moving up in height, the antenna's side lobes start to be visible, and the best cell may no longer be the closest one. The cell association pattern in this particular scenario becomes fragmented especially at a height of 300 meters (m) and above. The cell association pattern as shown in FIG. 2 only represents a specific scenario. The association pattern may depend on deployment parameters such as inter-site distance, antenna patterns, antenna height, and down-tilt angles of the antennas.

Figure 3:
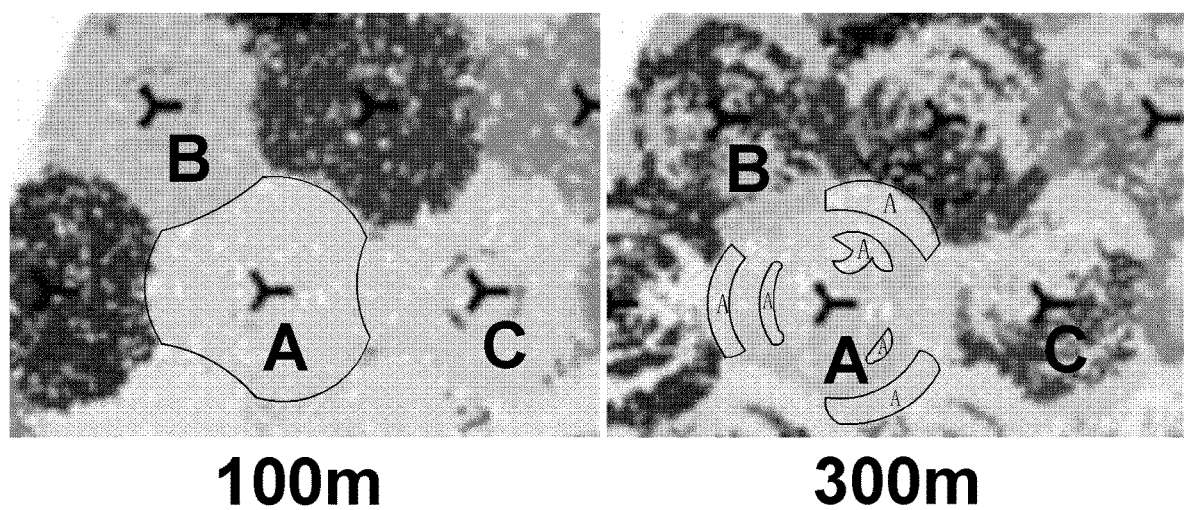
FIG. 3 shows simulated cell association patterns for different altitudes in a cellular network according to another embodiment.

FIG. 3 shows magnified simulated cell association patterns for different altitudes as shown in part of FIG. 2 in a cellular network according to another embodiment. The fragmented cell association pattern itself may be not necessarily a problem. Usually the deep antenna nulls are covered by the main lobe of neighbor base stations. For example, as shown in FIG. 3, the cell association pattern on 100 m is ideally nicely defined and contiguous area where best cell is mostly closest to the UE. But on 300 m, for the area close to base station A, there are mainly six areas marked with "A" where base station A is best cell, and they are served by the side lobes of base station A. The area between side lobes (deep antenna nulls) is mainly served by the main lobes of base stations B and C. This kind of cell association pattern can be understood easily from FIG. 4.

Figure 4:
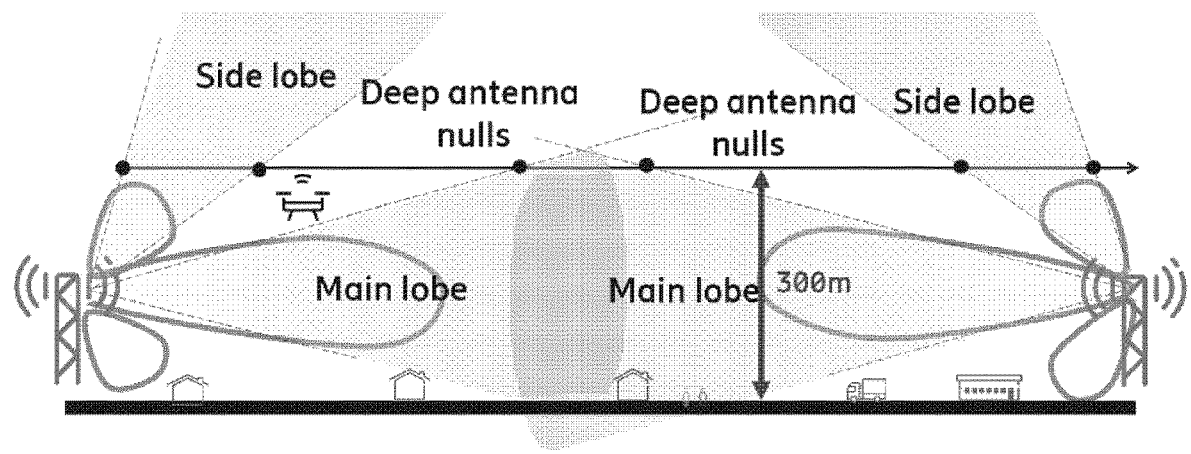
FIG. 4 schematically shows a radiation pattern of antenna devices of a cellular network according to another embodiment.
Figure 5:
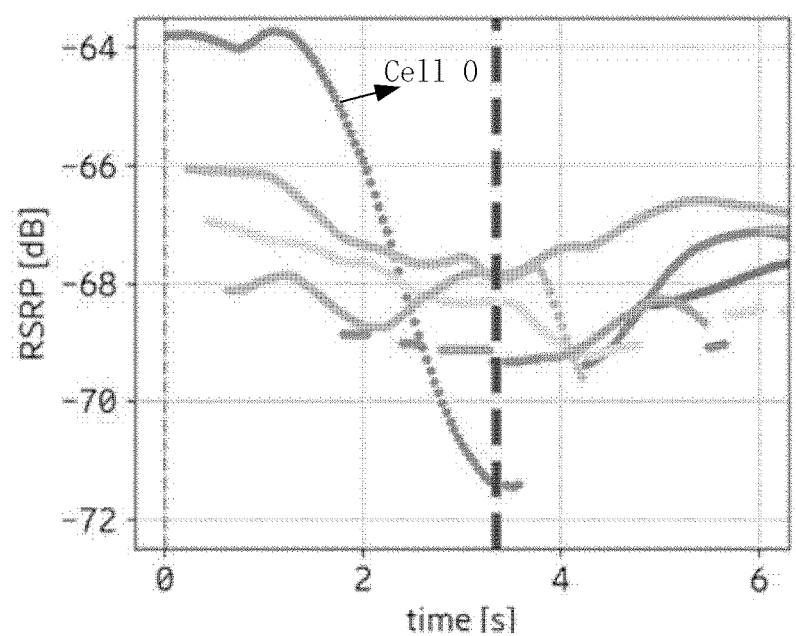
FIG. 5 shows a simulated result of user equipment's measurements of the signal strengths of cells in reach.

As shown in FIGS. 2-4, the network may provide seamless coverage for wireless devices such as drones in the sky. However, there may be some problems. For example, a drone served by a side lobe may experience very sharp drops in signal strength when moving in the sky due to LOS propagation. FIG. 5 shows a simulated result of UE's measurements of the signal strengths (e.g., Reference Signal Received Power (RSRP)) of the cells in reach. We can see the simulation curve of a cell 0's side lobe, and the simulation curves of other cells' main lobes. The other cells belong to some neighboring base stations of cell 0's base station. As shown in FIG. 5, at the beginning of the simulation (marked by a fine dashed vertical line), the UE such as drone selects a side lobe of cell 0 as the serving cell. After a few seconds, the UE such as drone flies from the side lobe to a deep antenna null area, the signal strength begins to drop rapidly, and before the UE such as drone can be handed over to one of the other cells shown in FIG. 5, it may declare radio link failure at the time instant marked by a thick dashed vertical line.

Setting down-tilt of the antenna to zero can improve aerial coverage with cost of deteriorating ground coverage, however it is still hard to achieve coverage at height of for example 300 m.

One existing solution is adding antenna being up-tilted for sky coverage only. The additional antenna device will increase investment and cause the wireless devices such as drones and user equipments in planes in the sky to experience LOS propagation conditions to many neighbor cells that cause comparably high interference levels.

Figure 6:
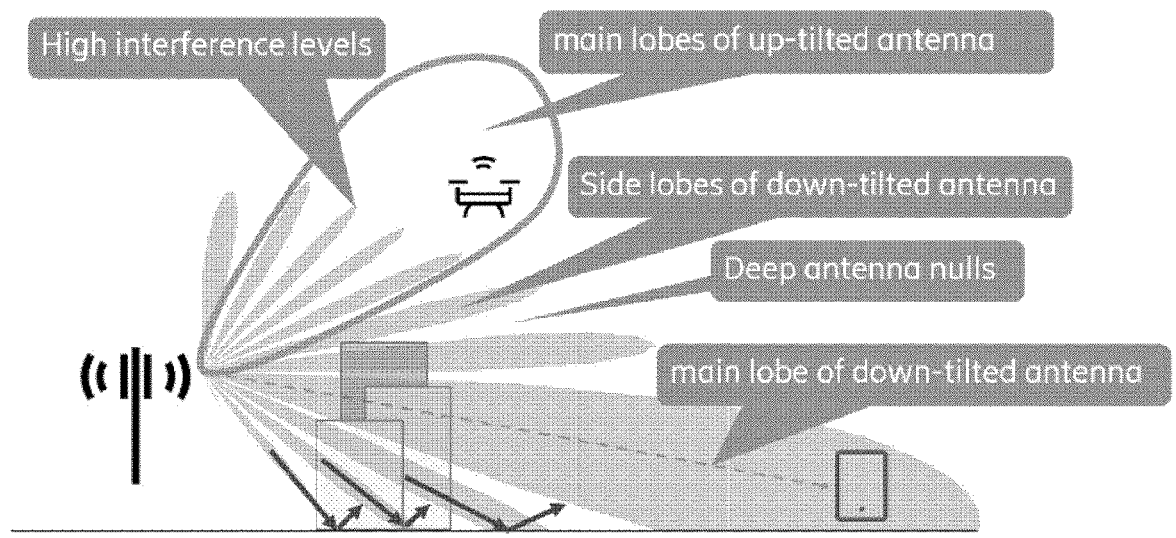
FIG. 6 schematically shows a radiation pattern of an up-tilted antenna and a down-tilted antenna according to an embodiment.

When wireless devices such as drones move through the area covered both by the main lobe of up-tilted antenna and the side lobes of down-tilted antenna, and if the additional antenna being up-tilted for sky coverage has better signal strength quality, cell of up-tilted antenna is the serving cell but drones experiencing LOS propagation conditions to both cells that cause comparably high interference levels may have difficulty in establishing and maintaining connection to the network. This kind of issue can be understood easily from FIG. 6.

Figure 7:
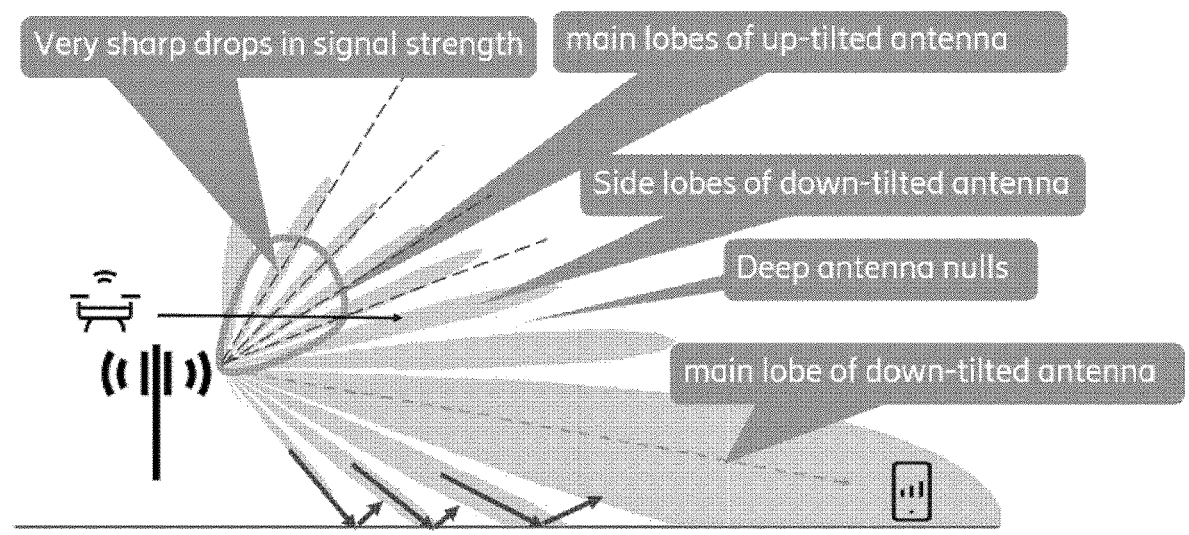
FIG. 7 schematically shows a radiation pattern of an up-tilted antenna and a down-tilted antenna according to another embodiment.

If the additional antenna being up-tilted for sky coverage has worse signal strength quality than the down-tilted antenna, cell of down-tilted antenna is the serving cell and when drones move from side lobe area to deep antenna null area, although the main lobe of up-tilted antenna has better signal strength than cells of neighbor base station, wireless devices such as drones served by a side lobe might experience very sharp drop in signal strength when moving in the sky to deep antenna nulls, then radio link failure may happen. This kind of issue can be understood easily from FIG. 7.

As described above, there has been identified some problems for the existing antenna device. For example, existing directional antenna has one main lobe only, it is hard to provide improved performance for wireless devices such as drones and user equipments in planes in the sky while maintaining the performance of ground wireless devices. There may be high DL/UL interference from multiple base stations when adding antenna being up-tilted for sky coverage only. There may not be able to implement seamless coverage at some altitudes for example from 120 m to 300 m. There may be no signal at high altitude for example more than 300 m. There may be too many neighbor cells and frequent handover but low successful rate due to sudden drop in signal strength. Current mobile networks such as LTE/5G are capable of serving drones in the low-altitude airspace. But more performance enhancements are needed for optimize LTE/5G connectivity toward more effective and efficient connectivity for drones while maintaining the performance of mobile devices on the ground.

To overcome or mitigate at least one above mentioned problem or other problems or provide a useful solution, the embodiments of the present disclosure propose an improved antenna device which can reflect a part of energy of the back lobe to a direction different from a direction of the main lobe. The proposed antenna device can be used for at least two coverage areas such as ground coverage and aerial coverage.

Figure 8:
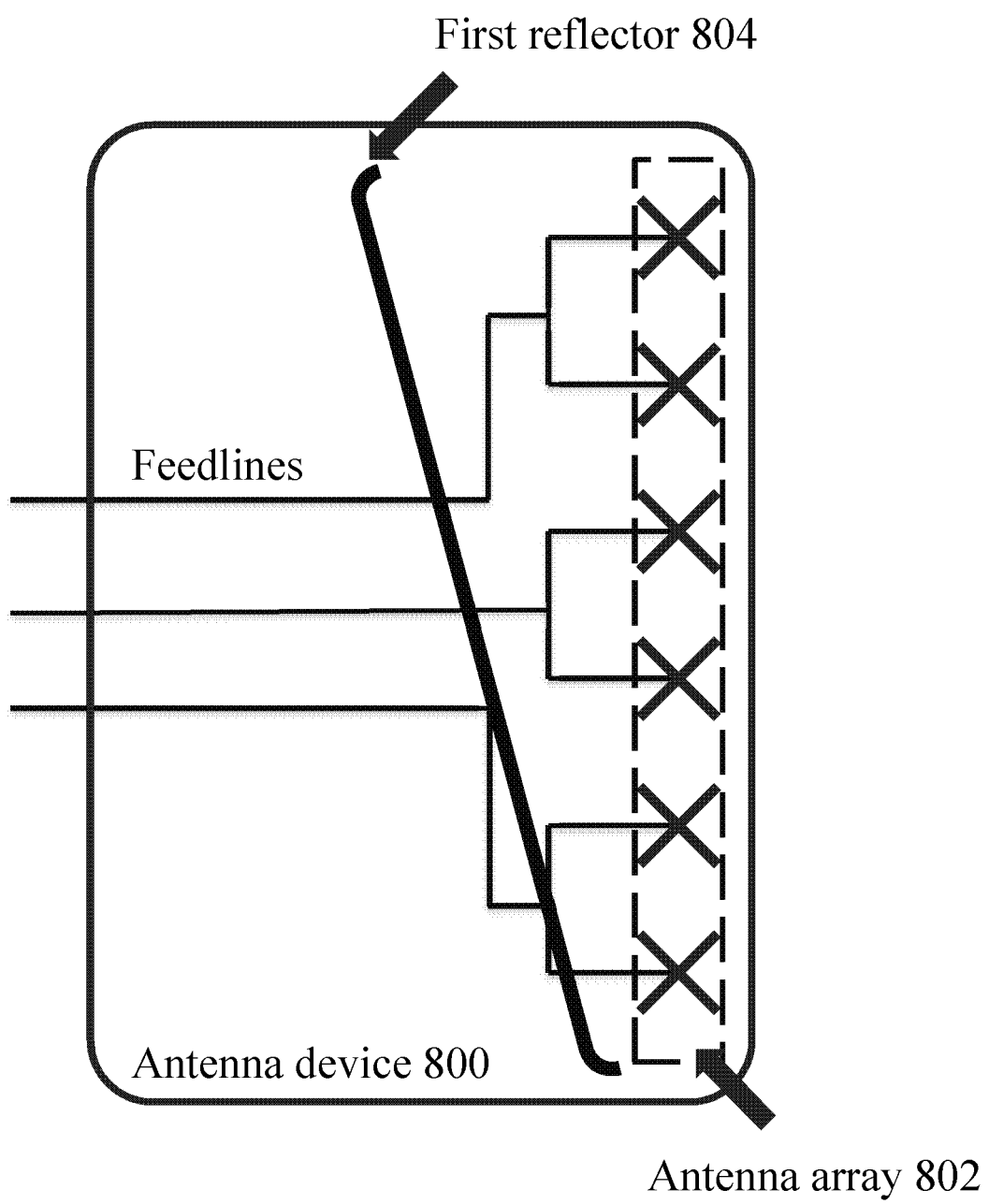
FIG. 8 is a schematic diagram showing an antenna device according to an embodiment of the disclosure.

FIG. 8 is a schematic diagram showing an antenna device according to an embodiment of the disclosure. The antenna device 800 comprises an antenna array 802 with a radiation pattern including a main lobe and a back lobe. The radiation pattern may further include one or more side lobes in addition to the main lobe and the back lobe. The antenna array 802 may be a set of multiple connected antennas which work together as a single antenna, to transmit or receive radio waves. The individual antennas in the antenna array 802 may be usually connected to a single receiver and/or transmitter by feedlines that feed the power to the individual antennas in a specific phase relationship. The radio waves radiated by each individual antenna combine and superpose, adding together (interfering constructively) to enhance the power radiated in desired directions, and cancelling (interfering destructively) to reduce the power radiated in other directions. Similarly, when used for receiving, the separate radio frequency signals from the individual antennas combine in the receiver with the correct phase relationship to enhance signals received from the desired directions and cancel signals from undesired directions. In addition, the antenna array 802 may be connected to multiple transmitter or receiver modules, each connected to a separate antenna element or a group of antenna elements. The antenna array can achieve higher gain (directivity), that is a narrower beam of radio waves, than could be achieved by a single antenna element. In general, the larger the number of individual antenna elements used, the higher the gain and the narrower the beam.

The antenna device 800 further comprises a first reflector 804 able to be configured to reflect a first part of energy of the back lobe to at least one direction different from a direction of the main lobe. The at least one direction different from the direction of the main lobe may be any suitable direction for example depending on the specific application scenario. As a first example, when the antenna device is used to serve wireless devices such as drones and user equipments in planes in the sky, the at least one direction different from the direction of the main lobe may comprise a direction toward sky. As a second example, when the antenna device is used to serve wireless devices in an indoor area, the at least one direction different from the direction of the main lobe comprises a direction toward the indoor area. As a third example, when the antenna device is used to serve wireless devices on at least one ground area, the at least one direction different from the direction of the main lobe comprises the directions toward the at least one ground area.

In this embodiment, the main lobe and the reflected back lobe may be used to cover two different areas respectively. As a first example, the main lobe may be used to cover an area on the ground and the reflected back lobe may be used to cover an area in the sky, or vice versa. As a second example, the main lobe may be used to cover an area on the ground and the reflected back lobe may be used to cover another area on the ground. As a third example, the main lobe may be used to cover an area in the sky and the reflected back lobe may be used to cover another area in the sky.

In an embodiment, the first part of energy of the back lobe is from 0% to 100% of the energy of the back lobe. 100% means that there is not any other reflector configured to reflect the energy of the back lobe to the direction of the main lobe (or front direction). The back lobe may share 50% of total radiation energy of the antenna device. 0% means that back lobe is removed and all radiation energy may be concentrated in the front direction (i.e., the direction of the main lobe).

In an embodiment, at least one of an orientation, a shape and a dimension of the first reflector are able to be adjusted manually or automatically. The first reflector may include any suitable mechanical and/or electronic device (not shown in FIG. 8) to enable the at least one of an orientation, a shape and a dimension of the first reflector can be adjusted manually or automatically.

Figure 9:
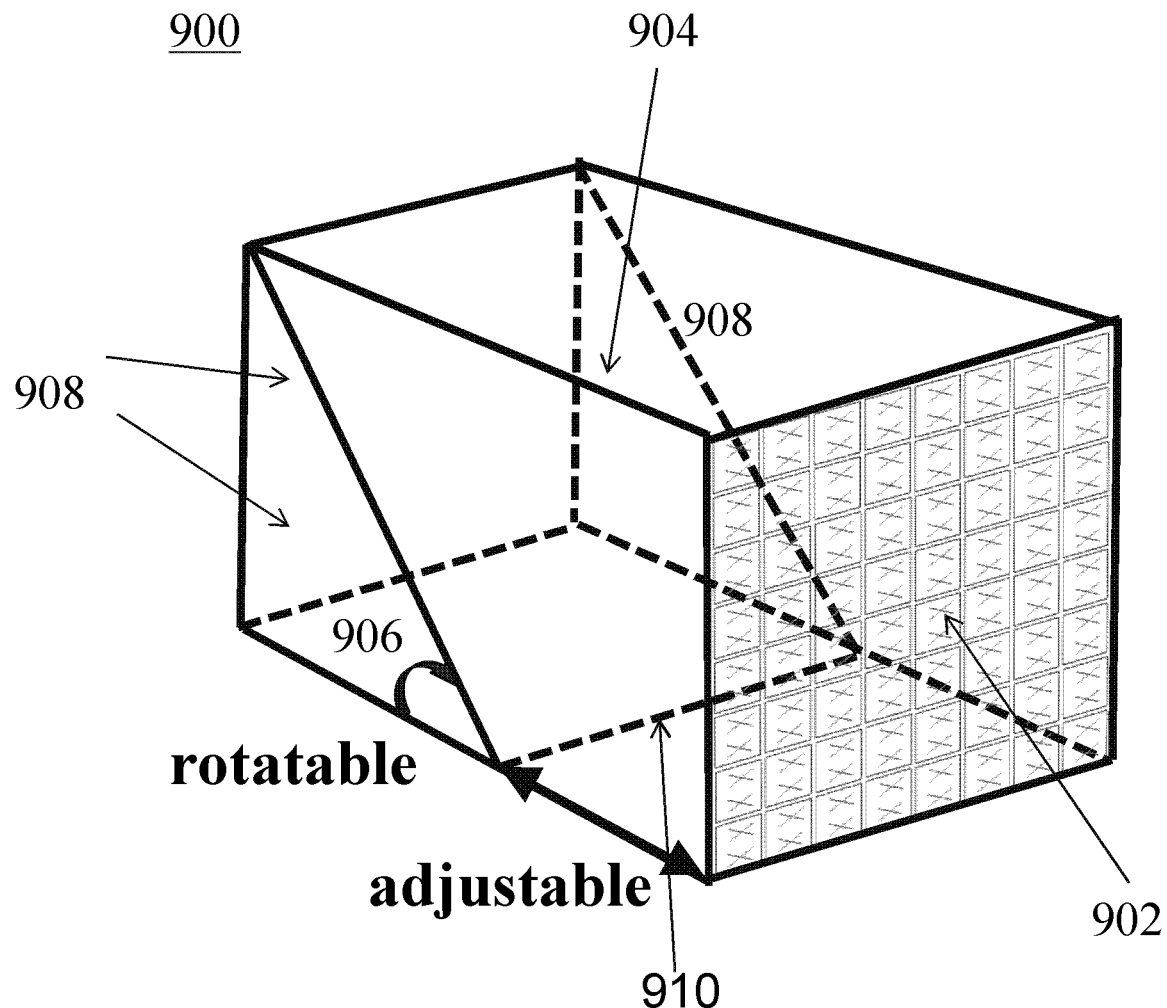
FIG. 9 is a schematic diagram showing an antenna device according to another embodiment of the disclosure.

FIG. 9 is a schematic diagram showing an antenna device 900 according to another embodiment of the disclosure. In this embodiment, the first reflector 904 may include a reflecting plate having a bottom wall 906 and side walls 908 being inclinedly mounted facing upward to reflect and guide the back lobe wave to a wanted direction. The angle of the first reflector 904 can be adjusted manually or remotely for network tuning by rotating round a rotatable and slideable element 910. The location of the first reflector 904 can be adjusted manually or remotely for network tuning by sliding the rotatable and slideable element 910 on the bottom wall 906.

In an embodiment, the first reflector may include one of a metal plate, a wire mesh, parallel wires or metal bars. Generally any conductor in a flat sheet will act in a mirror-like fashion for radio signals, but this also holds true for non-continuous surfaces as long as the gaps between the conductors are less than about 1/10 of the target wavelength. This means that wire mesh or even parallel wires or metal bars can be used, which is especially useful both for reducing the total amount of material and/or reducing wind loads.

In an embodiment, the first reflector may include a plurality of reflector elements each of which comprises one of a metal plate, a wire mesh, parallel wires or metal bars. Generally the plurality of reflector elements may locate in a same plane. In an embodiment, the plurality of reflector elements may have the same shape and dimension. In another embodiment, the plurality of reflector elements may have different shape and dimension. In addition, the location and/or the orientation of each reflector element are able to be adjusted manually or automatically. For example, a first part of the plurality of reflector elements may be located at a first location and face a first direction, a second part of the plurality of reflector elements may be located at a second location and face a second direction, and so on.

Figure 10:
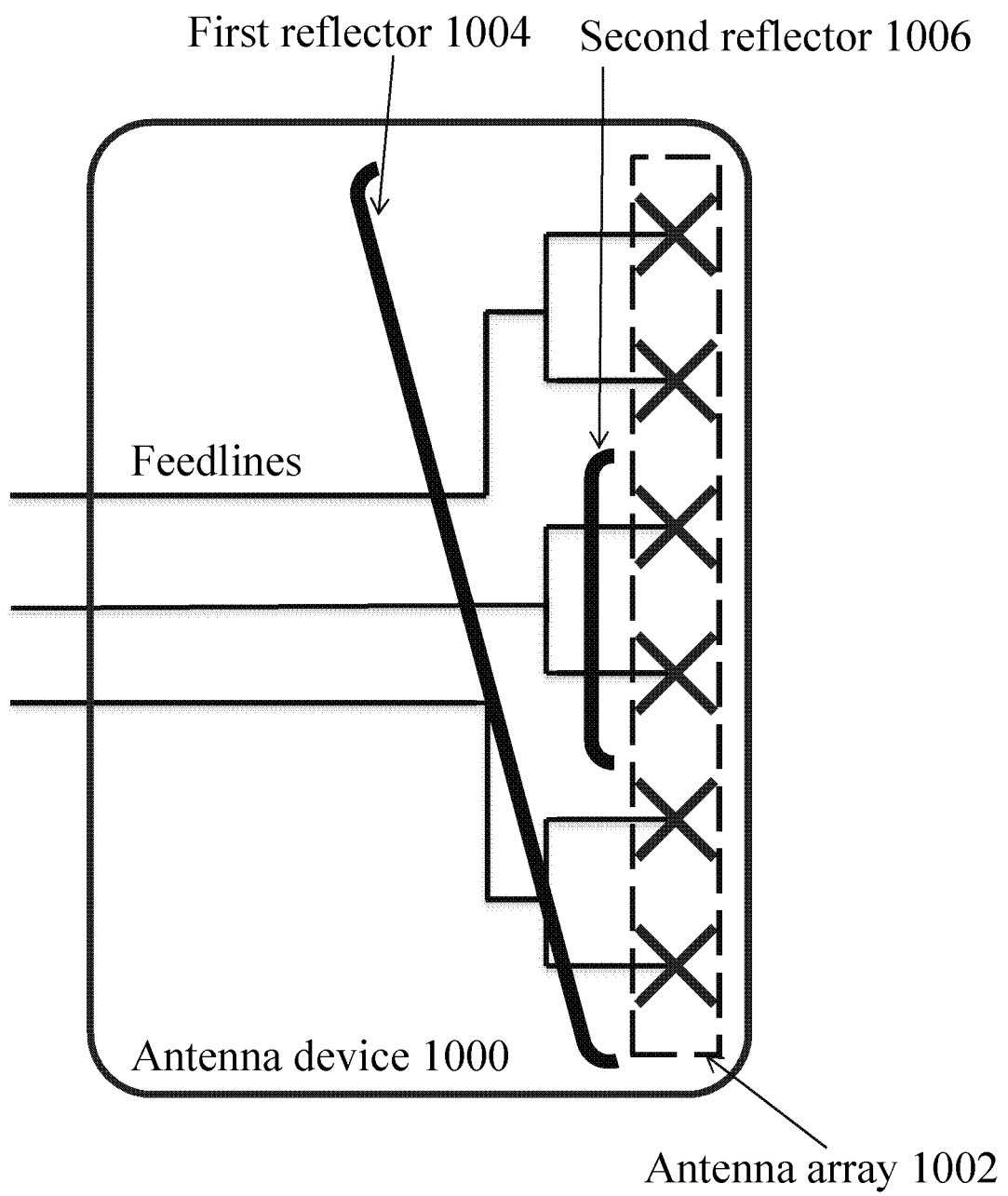
FIG. 10 is a schematic diagram showing an antenna device according to another embodiment of the disclosure.

FIG. 10 is a schematic diagram showing an antenna device according to another embodiment of the disclosure. The antenna device 1000 comprises an antenna array 1002 with a radiation pattern including a main lobe and a back lobe and a first reflector 1004 able to be configured to reflect a first part of energy of the back lobe to a direction different from a direction of the main lobe. The antenna array 1002 and first reflector 1004 may be similar to the antenna array 802 and first reflector 804 of FIG. 8. In addition, the antenna device further comprises a second reflector 1006 able to be configured to reflect a second part of energy of the back lobe to a direction of the main lobe. In generally, in order for the signal reflected by the second reflector 1006 to add to the output signal of main lobe to achieve gain, this may require the second reflector 1006 to be placed at a specific location behind the antenna array 1002. However, there are a number of factors that can change the specific location, and the location of the second reflector 1006 may vary.

In an embodiment, the energy of the back lobe consists of the first part of energy of the back lobe and the second part of energy of the back lobe. For example, if a part of energy of the back lobe is reflected by the first reflector, then the other part of energy of the back lobe is reflected by the second reflector. How much energy of the back lobe is to be reflected by the first reflector can be controlled by adjusting the shape and a dimension of the second reflector.

In an embodiment, at least one of an orientation, a shape and a dimension of the second reflector is able to be adjusted manually or automatically. The second reflector may include any suitable mechanical and/or electronic device (not shown in FIG. 10) to enable at least one of an orientation, a shape and a dimension of the second reflector can be adjusted manually or automatically.

In an embodiment, the second reflector includes one of a metal plate, a wire mesh, parallel wires or metal bars.

In an embodiment, the second reflector includes a plurality of reflector elements each of which comprises one of a metal plate, a wire mesh, parallel wires or metal bars.

In an embodiment, at least a part of the first reflector is configured to reflect a part of energy of the back lobe to the direction of the main lobe and the at least a part of the first reflector is set in a same plane as the second reflector. The location and orientation of the at least a part of the first reflector can be adjusted such that the at least a part of the first reflector and the second reflector are located in a same plane. For example, when the first reflector includes a plurality of reflector elements each of which may comprise one of a metal plate, a wire mesh, parallel wires or metal bars, the location and orientation of at least a part of the plurality of reflector elements can be adjusted such that the at least a part of the plurality of reflector elements and the second reflector are located in a same plane. In this embodiment, the at least a part of the first reflector can take the role of the second reflector.

Figure 11:
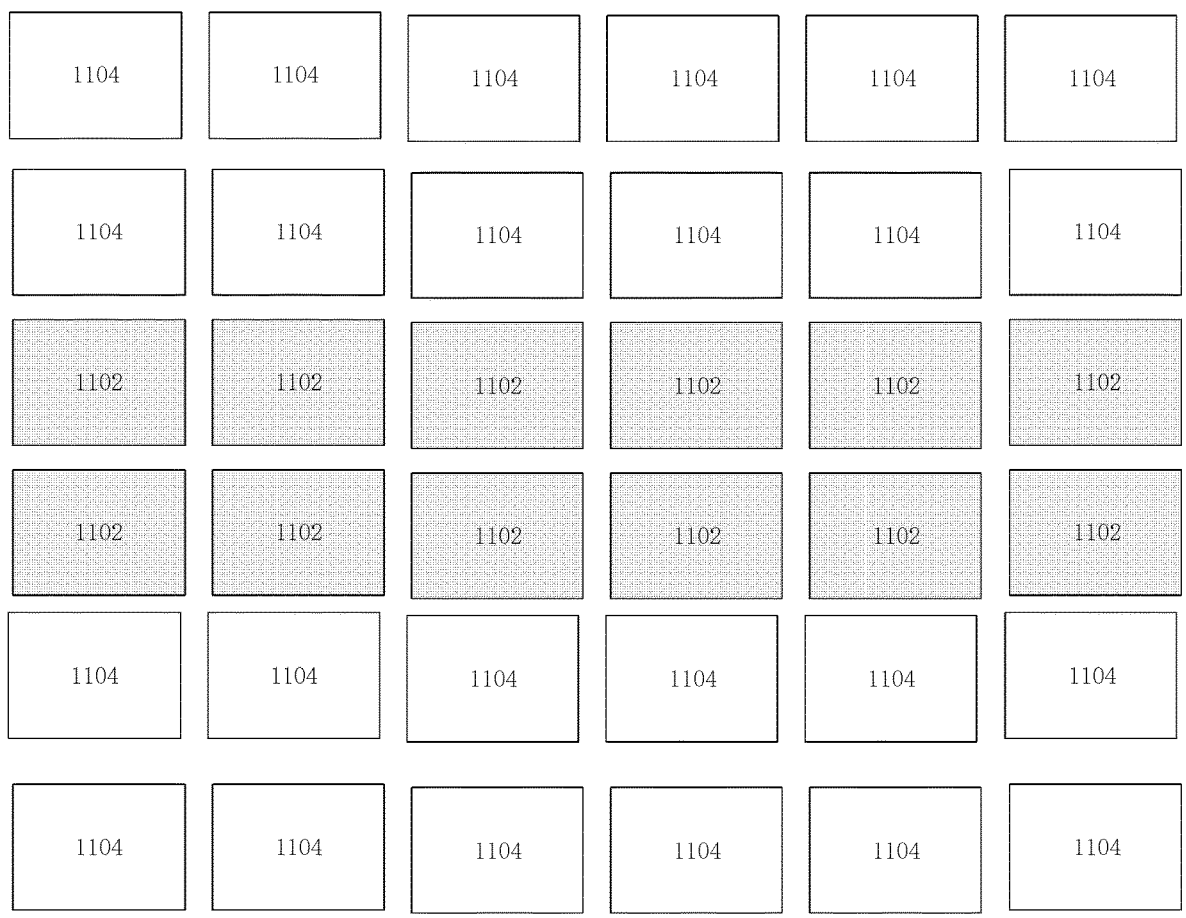
FIG. 11 is a schematic diagram showing the first reflector and the second reflector according to an embodiment of the disclosure.
Figure 12:
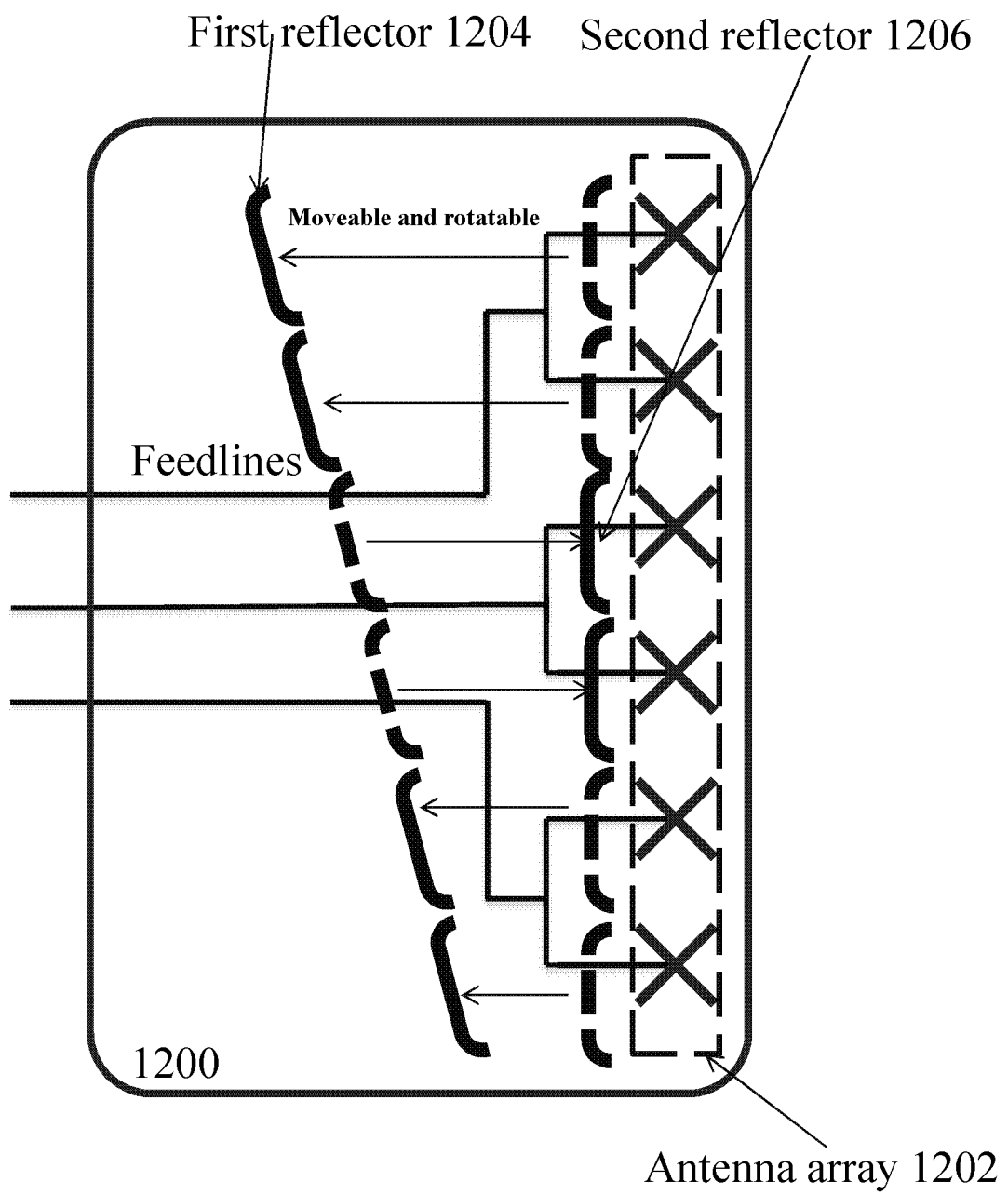
FIG. 12 is a schematic diagram showing an antenna device according to another embodiment of the disclosure.
Figure 13:
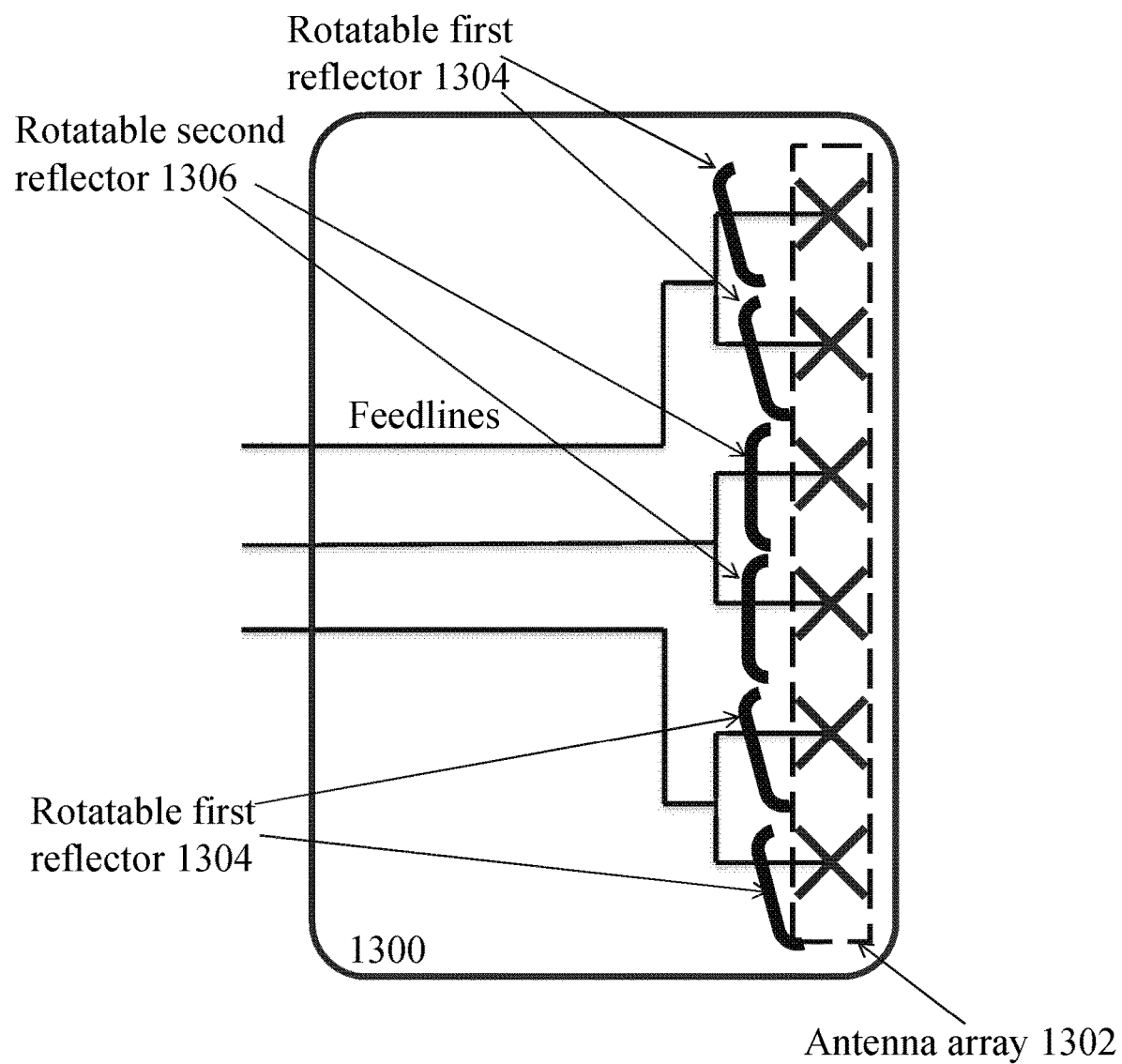
FIG. 13 is a schematic diagram showing an antenna device according to another embodiment of the disclosure.

FIG. 11 is a schematic diagram showing the first reflector and the second reflector according to an embodiment of the disclosure. As shown in FIG. 11, there are 24 first reflectors 1104 and 12 second reflectors 1102, each of which is a metal plate. It is noted that the numbers, shape and dimension of the first reflectors and the second reflectors shown in FIG. 11 are only for the purpose of illustration and may be different in other embodiments. The location and/or orientation of each reflector can be adjusted as shown in FIGS. 12-13.

In an embodiment, the antenna device is used for a base station such as NodeB, eNodeB, gNB, and so forth. In addition, the antenna device may be used for any other suitable radio frequency devices in other embodiments.

Figure 14:
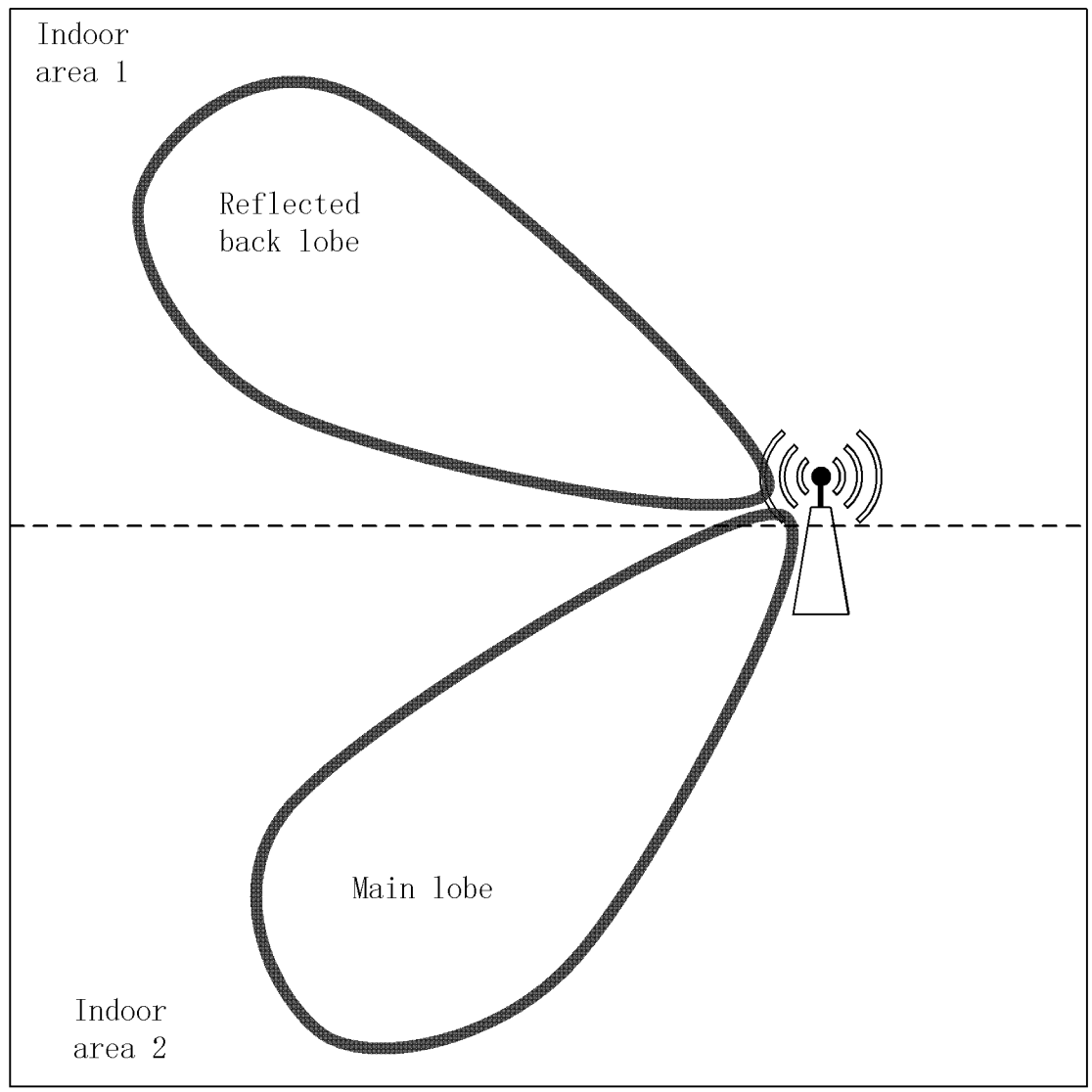
FIG. 14 schematically shows an indoor scenario where the antenna device can be used.

In an embodiment, the antenna device is used in indoor scenario as shown in FIG. 14. As shown in the FIG. 14, in the indoor scenario, the main lobe of the antenna device may be used to serve an indoor area 2 and the reflected back lobe may be used to serve another indoor area 1. It is noted that FIG. 14 only shows an example indoor scenario, and there may be any other suitable indoor scenarios which can use the antenna device according to embodiments of the disclosure.

Figure 15:
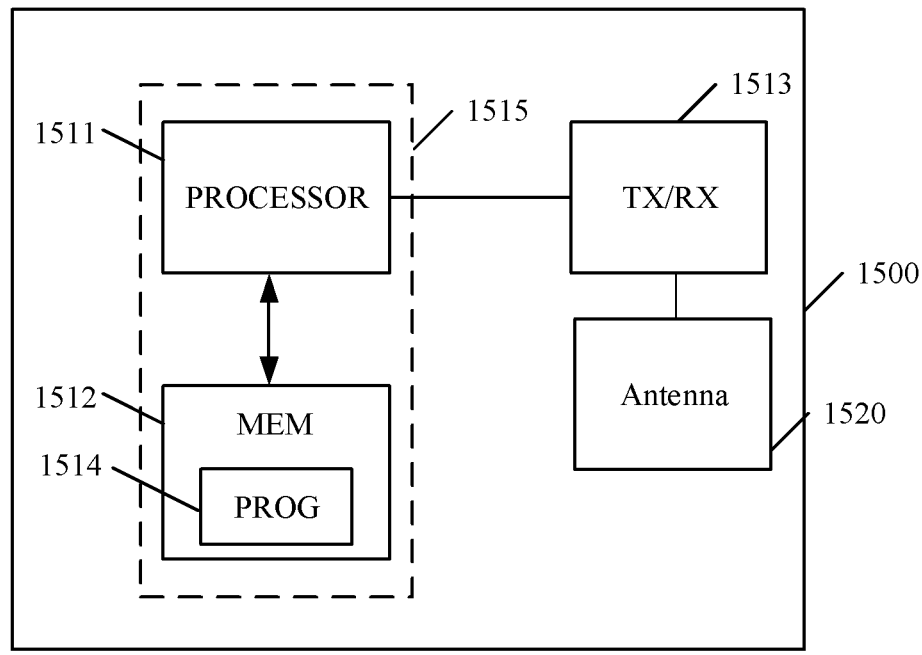
FIG. 15 illustrates a simplified block diagram of a base station according to an embodiment of the present disclosure.

FIG. 15 is a block diagram showing a base station (BS) according to an embodiment of the disclosure. The BS 1500 may comprise at least one processor 1511, such as a data processor (DP) and at least one memory (MEM) 1512 coupled to the processor 1511. The BS 1500 may further comprise a transmitter TX and receiver RX 1513 coupled to the processor 1511. The BS 1500 may further comprise an antenna device 1520 coupled to the transmitter TX and receiver RX 1513. The MEM 1512 stores a program (PROG) 1514. The PROG 1514 may include instructions that, when executed on the associated processor 1511, enable the BS 1500 to implement functions of the BS. The antenna device is configured to transmit and/or receive a radio frequency (RF) signal. A combination of the at least one processor 1511 and the at least one MEM 1512 may form processing means 1515 adapted to implement various embodiments of the present disclosure.

Figure 16:
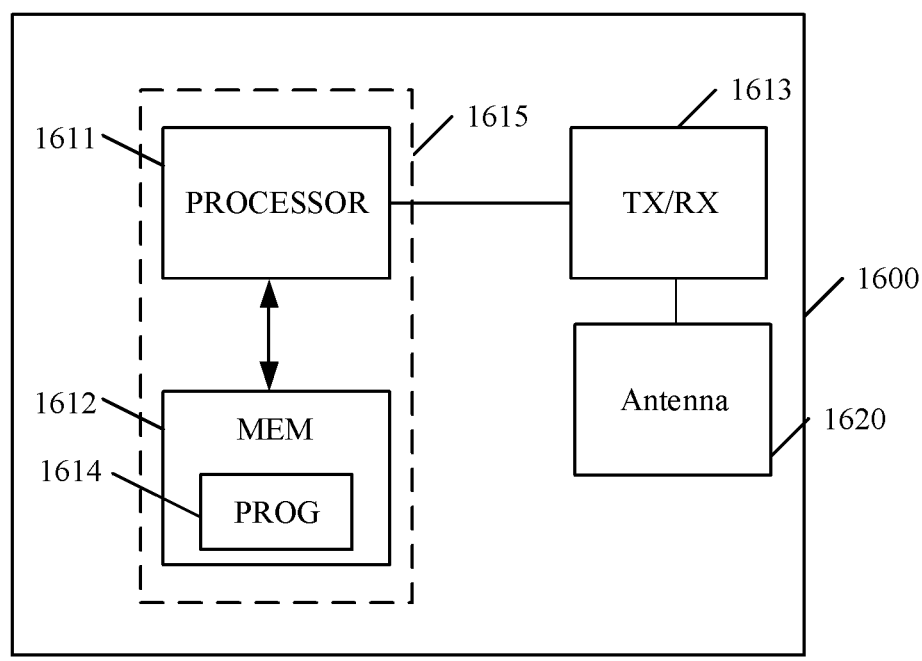
FIG. 16 illustrates a simplified block diagram of a terminal device according to an embodiment of the present disclosure.

FIG. 16 is a block diagram showing a terminal device according to an embodiment of the disclosure. The terminal device 1600 may comprise at least one processor 1611, such as a data processor (DP) and at least one memory (MEM) 1612 coupled to the processor 1611. The terminal device 1600 may further comprise a transmitter TX and receiver RX 1613 coupled to the processor 1611. The terminal device 1600 may further comprise an antenna device 1620 coupled to the transmitter TX and receiver RX 1613. The MEM 1612 stores a program (PROG) 1614. The PROG 1614 may include instructions that, when executed on the associated processor 1611, enable the terminal device 1600 to implement functions of the terminal device. The antenna device is configured to transmit and/or receive a radio frequency (RF) signal to and/or from a base station according to embodiments of the disclosure. A combination of the at least one processor 1611 and the at least one MEM 1612 may form processing means 1615 adapted to implement various embodiments of the present disclosure.

Various embodiments of the present disclosure may be implemented by computer program executable by one or more of the processors 1511 and 1621, software, firmware, hardware or in a combination thereof.

The MEMs 1512 and 1622 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 811 and 821 may be of any type suitable to the local technical environment, and may include one or more of general purpose computers, special purpose computers, microprocessors, digital signal processors (DSPs) and processors based on multicore processor architecture, as non-limiting examples.

The embodiments of the disclosure provide an antenna device to radiate wave such as back lobe to different directions, which can be used for ground coverage and aerial coverage with same antenna device. With the proposed antenna device, the proportion of energy emitted in the forward direction may be decreased and the back lobe is created by emplacing the second reflector with adjustable dimension. The shape and dimension of the second reflector can be adjusted manually or automatically by any suitable device to change the reflection coefficient from 0% to 100%. 0% means that there is not the second reflector, 100% means that the back lobe is removed and all energy of the back lobe is concentrated in the front direction (e.g., the direction of the main lobe). In addition, the orientation of the second reflector can be adjusted manually or automatically by any suitable device to reflect the back lobe to a direction different from the direction of the main lobe.

Since the signal propagation in the sky is close to free-space propagation, the signal strength becomes stronger due to the reduced path loss. The stronger signal strength from the serving base station is desirable. So usually the proposed antenna device may allocate a small port of power to the back lobe to minimize the impact to the ground coverage and provide good coverage for aerial space. In addition, with the proposed antenna device, the deep antenna nulls can be covered by the back lobe of same base station, which means the main lobe doesn't need much power to cover the deep antenna nulls of neighbor base stations. Without the proposed antenna device the main lobe has to allocate enough power to cover deep antenna nulls of neighbor base stations to provide seamless coverage at a high altitude such as 300 m.

Another advantage of the proposed antenna device is that the back lobe, the main lobe and the side lobes belong to a same cell. As mentioned above, adding up-tilted antenna for aerial coverage will cause high interference levels between cells or sudden drop in signal strength, with the proposed antenna device, one cell coverage will solve these problems.

The angle and distance between the first reflector and the second reflector can be adjusted (such as move or rotate) manually or remotely for network tuning. In this way, the angle and location of the first reflector and the reflection coefficient can be adjusted such that different shapes of the back lobe can be created for different use cases such as aerial scenario and indoor scenario.

Because the first reflector may be inclinedly mounted, the antenna size of the proposed antenna device is bigger than the traditional antenna. But 5G network will use high frequency bands i.e. SHF (super high frequency), EHF (extremely high frequency), the dimension of antenna decreases with the wavelength, so the proposed antenna device will be able to provide more efficient aerial coverage for 5G network. For LTE or 5G low frequency antenna, the antenna of the proposed antenna device can be mounted on top of building.

The proposed antenna device can be implemented for outdoor directional antenna, massive-MIMO (Multiple Input Multiple Output) antenna, especially for 5G and coming technologies like 6G (sixth generation), and indoor dot antenna. The proposed antenna device can be used for coverage-limited scenarios. The proposed antenna device can be mounted along the routes of drones to provide better coverage for aerial airspace. The proposed antenna device can be used in the indoor scenario, for example, 5G NR radio dot for in-door coverage, for example coverage 2 directions or 2 conjoint rooms with the same dot antenna.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. An antenna device, comprising:
   an antenna array with a radiation pattern including a main lobe and a back lobe;
   a first reflector configurable to reflect a first part of energy of the back lobe to at least one direction different from a direction of the main lobe; and
   a second reflector configurable to reflect a second part of energy of the back lobe to a direction of the main lobe.

2. The antenna device according to claim 1, wherein the first part of energy of the back lobe is from 0% to 100% of the energy of the back lobe.

3. The antenna device according to claim 1, wherein at least one of an orientation, a shape and a dimension of the first reflector are able to be adjusted manually or automatically.

4. The antenna device according to claim 1, wherein the direction different from the direction of the main lobe comprises a direction toward sky.

5. The antenna device according to claim 1, wherein the first reflector includes one of a metal plate, a wire mesh, parallel wires or metal bars.

6. The antenna device according to claim 1, wherein the first reflector includes a plurality of reflector elements each of which comprises one of a metal plate, a wire mesh, parallel wires or metal bars.

7. The antenna device according to claim 1, wherein the energy of the back lobe consists of the first part of energy of the back lobe and the second part of energy of the back lobe.

8. The antenna device according to claim 1, wherein at least one of an orientation, a shape and a dimension of the second reflector is able to be adjusted manually or automatically.

9. The antenna device according to claim 1, wherein the second reflector includes one of a metal plate, a wire mesh, parallel wires or metal bars.

10. The antenna device according to claim 1, wherein the second reflector includes a plurality of reflector elements each of which comprises one of a metal plate, a wire mesh, parallel wires or metal bars.

11. The antenna device according to claim 1, wherein at least a part of the first reflector is configured to reflect a part of energy of the back lobe to the direction of the main lobe and the at least a part of the first reflector is set in a same plane as the second reflector.

12. A base station comprising:
an antenna device, configured to at least one of transmit and receive a radio frequency (RF) signal; wherein the antenna device comprising:
an antenna array with a radiation pattern including a main lobe and a back lobe;
a first reflector configurable to reflect a first part of energy of the back lobe to at least one direction different from a direction of the main lobe; and
a second reflector configurable to reflect a second part of energy of the back lobe to a direction of the main lobe.

13. The base station according to claim 12, wherein at least one of an orientation, a shape and a dimension of the first reflector are able to be adjusted manually or automatically.

14. The base station according to claim 12, wherein the direction different from the direction of the main lobe comprises a direction toward sky.

15. The base station according to claim 12, wherein the first reflector includes one of a metal plate, a wire mesh, parallel wires or metal bars.

16. The base station according to claim 12, wherein at least one of an orientation, a shape and a dimension of the second reflector is able to be adjusted manually or automatically.

17. The base station according to claim 12, wherein the second reflector includes one of a metal plate, a wire mesh, parallel wires or metal bars.

18. The base station according to claim 12, wherein at least a part of the first reflector is configured to reflect a part of energy of the back lobe to the direction of the main lobe and the at least a part of the first reflector is set in a same plane as the second reflector.

19. The base station according to claim 12, wherein the base station is used in indoor scenario.

* * * * *